(12) United States Patent
Dragojevic et al.

(10) Patent No.: US 12,399,880 B2
(45) Date of Patent: Aug. 26, 2025

(54) TREE-BASED DATA STRUCTURE

(71) Applicant: Microsoft Technology Licensing, LLC, Redmond, WA (US)

(72) Inventors: Aleksandar Dragojevic, Cambridge (GB); Junyi Liu, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/563,627

(22) PCT Filed: May 18, 2022

(86) PCT No.: PCT/US2022/029722
§ 371 (c)(1),
(2) Date: Nov. 22, 2023

(87) PCT Pub. No.: WO2022/251009
PCT Pub. Date: Dec. 1, 2022

(65) Prior Publication Data
US 2024/0241873 A1 Jul. 18, 2024

(30) Foreign Application Priority Data
May 26, 2021 (EP) ..................................... 21175921

(51) Int. Cl.
*G06F 16/22* (2019.01)
*G06F 16/23* (2019.01)
*G06F 16/2455* (2019.01)

(52) U.S. Cl.
CPC ...... *G06F 16/2246* (2019.01); *G06F 16/2365* (2019.01); *G06F 16/24552* (2019.01)

(58) Field of Classification Search
CPC ........... G06F 16/2246; G06F 16/24552; G06F 16/2365
See application file for complete search history.

(56) References Cited

U.S. PATENT DOCUMENTS

| 7,082,438 B2 | 7/2006 | Najork |
| 10,406,446 B2 | 9/2019 | Amaitis |

(Continued)

FOREIGN PATENT DOCUMENTS

CN 104063446 A 9/2014

OTHER PUBLICATIONS

Office Action Received for European Application No. 22728329.8, mailed on Jan. 9, 2024, 3 pages.

(Continued)

*Primary Examiner* — Courtney Harmon
(74) *Attorney, Agent, or Firm* — Barta Jones, PLLC

(57) ABSTRACT

A writer writes items to leaf nodes of a tree, and a reader read items from the leaf nodes. Each node comprises a respective first block and second block, the first block comprising a plurality of the items of the respective leaf sorted in order of key. When writing new items to a leaf, the writer writes the new items to the second block of the identified leaf node in an order in which written, rather than sorted in order of key. When reading one or more target items from a leaf, the reader searches the leaf for the one or more target items based on a) the order of the items as already sorted in the first block and b) the reader sorting the items of the second block by key relative to the items of the first block.

20 Claims, 9 Drawing Sheets

(56) References Cited

U.S. PATENT DOCUMENTS

| | | |
|---|---|---|
| 10,417,209 B1 | 9/2019 | Deran |
| 10,572,452 B1 | 2/2020 | Singh |
| 10,599,485 B2 | 3/2020 | Levandoski |
| 2006/0026188 A1 | 2/2006 | Najork |
| 2010/0306222 A1 | 12/2010 | Freedman |
| 2010/0328115 A1* | 12/2010 | Binnig ............... G06F 16/24557 341/51 |
| 2011/0252067 A1 | 10/2011 | Marathe |
| 2016/0110403 A1 | 4/2016 | Lomet |
| 2016/0335299 A1 | 11/2016 | Vemulapati et al. |
| 2016/0357791 A1* | 12/2016 | Levandoski ............... G06F 9/46 |
| 2018/0189342 A1 | 7/2018 | Danilov |
| 2018/0373727 A1 | 12/2018 | Ding et al. |
| 2019/0235933 A1 | 8/2019 | Levandoski |
| 2019/0294709 A1* | 9/2019 | Gupta ..................... G06F 16/17 |
| 2020/0050692 A1 | 2/2020 | Antonopoulos |
| 2020/0257732 A1* | 8/2020 | Oh ..................... G06F 16/2322 |
| 2020/0293506 A1 | 9/2020 | Gupta et al. |
| 2021/0303533 A1* | 9/2021 | Legler ................. G06F 16/2246 |
| 2022/0027349 A1* | 1/2022 | Shuo ................... G06F 16/2282 |
| 2022/0138095 A1* | 5/2022 | Jain ....................... G06F 3/0608 711/171 |
| 2024/0273080 A1 | 8/2024 | Dragojevic |

OTHER PUBLICATIONS

Avery, et al., "MongoDB revs you up: What storage engine is right for you? (Part 1)", accessed on link https://www.percona.com/blog/mongodb-revs-you-up-what-storage-engine-is-right-part-1/, Jan. 6, 2016, 10 pages.

Basin, et al., "KiWi: A Key-Value Map for Scalable Real-Time Analytics", ACM, 2017, 13 pages.

Extended European Search Report Issued in European Application No. 21181926.3, mailed on Dec. 22, 2021, 7 Pages.

Extended Search Report Issued in European Patent Application No. 211759212, Nov. 17, 2021, 11 Pages.

International Search Report and Written Opinion Issued in PCT Application No. PCT/US22/029722, mailed on Jul. 14, 2022, 14 pages.

International Search Report and Written Opinion received for PCT Application No. PCT/US22/032923 Sep. 28, 2022, 10 pages.

Isoda, et al., "POMVCC: Partial Order Multi-Version Concurrency Control", in International Journal on Advances in Software, vol. 11, Issue No. 3 & 4, May 20, 2018, pp. 452-465.

Nelson, et al., "Bundled References: An Abstraction for Highly-Concurrent Linearizable Range Queries", arXiv:2012.15438v1, Dec. 31, 2020, 14 pages.

Neumann., et al., "Fast Serializable Multi-Version Concurrency Control for Main-Memory Database Systems," SIGMOD '15, 2015, pp. 677-689.

Wu, et al., "An Empirical Evaluation of In-Memory Multi-Version Concurrency Control", in Proceedings of the VLDB Endowment, vol. 10, Issue No. 7, Mar. 1, 2017, pp. 781-792.

Notice of Allowance mailed on Sep. 30, 2024, in U.S. Appl. No. 18/569,045, 10 pages.

Communication under Rule 71(3) Received in European Patent Application No. 22734080.9, mailed on Apr. 9, 2025, 05 pages.

* cited by examiner

Inclusive scan for [14,22]

Covering scan for [14,22]

Covering scan for (14,22)

a) State before update b) During update c) Update complete

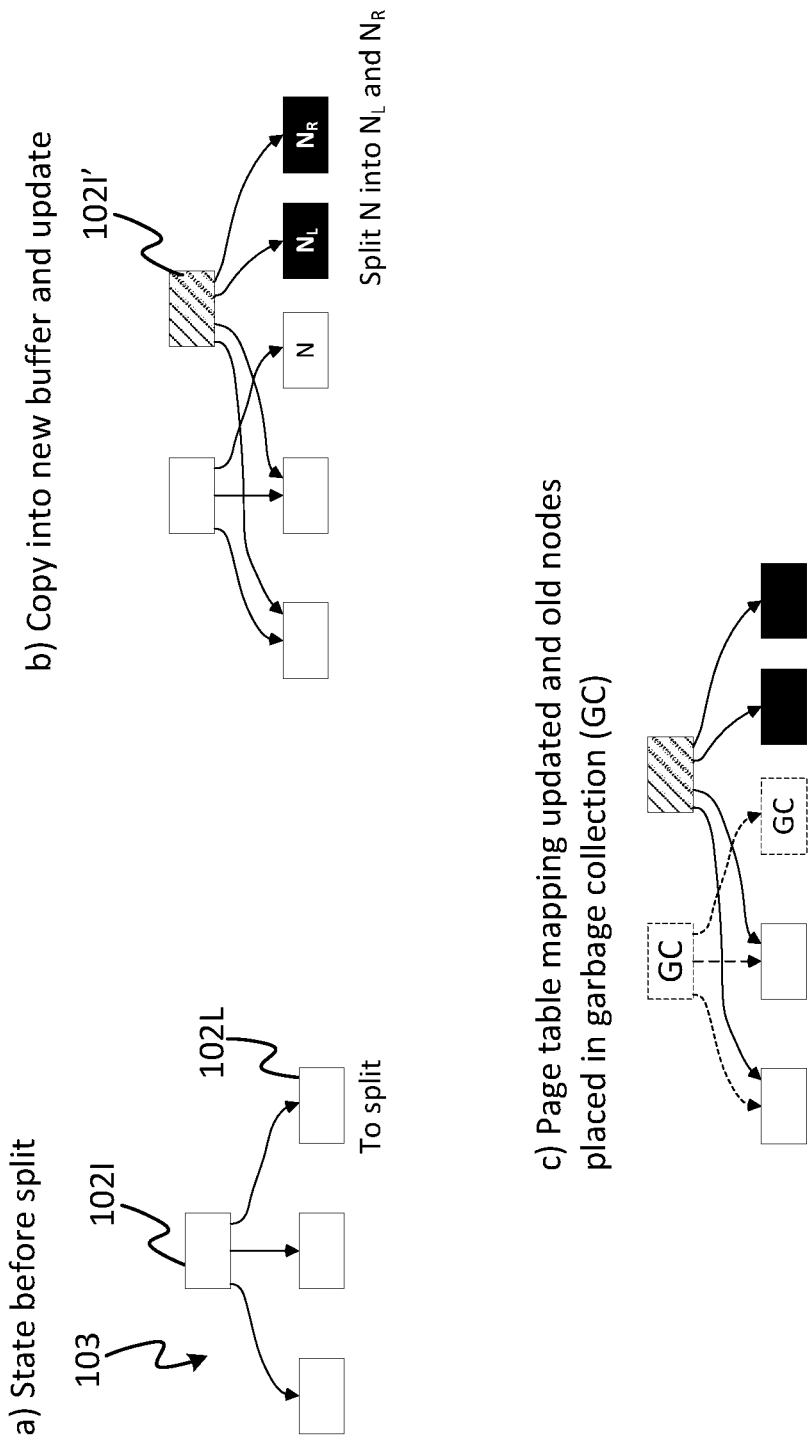

TREE-BASED DATA STRUCTURE

BACKGROUND

A tree structure such as a B-tree can be used as an index data structure for storing key-value pairs (each pair comprising a value, which is the content being stored, and a key, which is used to index the value). Each leaf node of the tree contains a plurality of items, which are the key-value pairs. Further up the tree from the leaves, each internal node of the tree contains an indication of a range of key values encompassed by each of its children (which could be leaves or other interior nodes). When a new item is to be added to the tree, the writer uses the tree structure to determine which leaf contains the range of keys into which the key of the new item falls. If this leaf is not full, the new item can just be added to the existing leaf. However it the leaf is full (leaves and internal nodes typically have a maximum size in bytes) then the leaf will be split. I.e. a new leaf is created. This also means updating the parent node of the old and new leaves so as to properly reference the key ranges of the two leaves. If that update to the parent would also take the parent beyond its maximum size, then that parent itself is split and the references of the grandparent are updated, and so forth. If items are deleted this could also involve merging leaves or internal nodes. There are a number of operations that a writer or a reader may be required to perform in a given application. A reader may read an individual item with a specific key, or may perform a range scan to read from a range of keys. A writer may write a new entry, modify an existing entry, or delete an entry.

Index data structures are used in a wide range of software systems, e.g. data stores and databases, file systems, operating systems, etc. An index data structure stores key-value pairs and it supports lookups, scans, inserts, and deletes of key-value pairs, among other operations. B-trees are one such index data structure. B-tree is an in-order index, meaning that it also supports scan operations. A scan operation returns all key-value pairs stored in the tree with keys in a specified range.

SUMMARY

In a tree-based data structure such as a B-tree, it would be desirable to balance workload between writer and reader. For instance if new entries are simply added in chronological order, unsorted by key, then this is very quick for the writer. However the reader then has to sort through the items at read-time in order to perform an individual read or a range scan (at least a range scan requires sorting—an individual read could just, it is simpler to implement both lookups and range scans in the same way, using sorting). On the other hand, if the writer places all new entries in sorted order every time it performs a write, this will make reading very quick for the reader, but places a larger burden on the writer at write-time. It would be desirable to provide a compromise between these two approaches.

According to one aspect disclosed herein there is provided a system comprising memory which stores a data structure, the data structure comprising a tree structure which comprises a plurality of nodes each having a node ID. Some nodes are leaf nodes and others internal nodes, wherein each internal node is a parent of a respective set of one or more children in the tree structure. Each child is either a leaf node or another internal node, and each leaf node is a child but not a parent. Each of the leaf nodes comprises a respective set of one or more items each comprising a key-value pair, and each of the internal nodes maps the node ID of each of its respective children to a range of keys encompassed by the respective child. The system further comprises a writer implemented in software, hardware or a combination thereof, arranged to write items to the leaf nodes; and a reader implemented in software, hardware or a combination thereof, arranged to read items from the leaf nodes. Each of the leaf nodes comprises a respective first block and a respective second block, the first block comprising a plurality of the items of the respective leaf node sorted in an address space of the memory in order of key. The writer is configured so as, when writing new items to the tree structure, to identify which leaf node to write to by following the mapping of keys to node IDs through the tree structure, and to write the new items to the second block of the identified leaf node in an order in which written, rather than sorted in order of key. The reader is configured so as, when reading one or more target items from the tree structure, to determine which leaf node to read from by following the mapping of keys to node IDs through the tree structure, and then to search the determined leaf node for the one or more target items based on a) the order of the items as already sorted in the first block and b) the reader sorting the items of the second block by key relative to the items of the first block.

In embodiments the first block may have a larger maximum size than the second block, and hence the first block may be referred to as the "large block" and the second block as the "small block". In embodiments the writer may be implemented in software but the reader may be implemented in custom hardware, e.g. in a programmable gate array (PGA) or field programmable gate array (FPGA). More generally however the writer could be implemented in hardware (e.g. a hardware accelerator) and/or the reader could be implemented in software.

BRIEF DESCRIPTION OF THE DRAWINGS

To aid understanding of embodiments disclosed herein and to illustrate how such embodiments may be put into effect, reference is made, by way of example only, to the following drawings in which:

FIG. 12 schematically illustrates a method of splitting a leaf node during an insert.

DETAILED DESCRIPTION OF EMBODIMENTS

Figure 1:
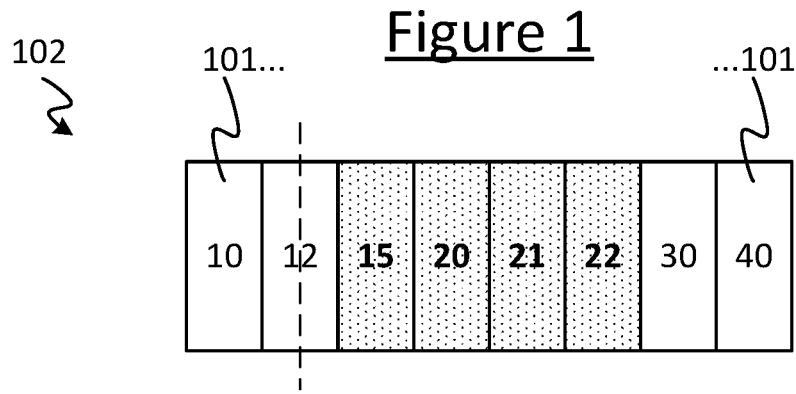
FIG. 1 schematically illustrates a range scan in the form of an inclusive scan for an example key interval [14, 22], whereby the interval formed by the keys of the returned items is the biggest subset that falls within the input interval.

The present disclosure provides a node layout with each node consisting of a first and a second block. Preferably the first block has a larger maximum size (in bits or bytes) than the second block, and hence the first and second block may be referred to as the large block and small block respectively. The following will be described by way of example with reference to large and small blocks, but anywhere below this could in principle be replaced more generally with "first block" and "second block" respectively.

The large block is sorted, which allows for efficient searching of a node. Sorted in this context means that the items are sorted by key, such that the order of the items by key is made the same as the order the items appear in the address space of the memory (either virtual or physical address space depending on implementation). The small block on the other hand comprises the latest inserts and deletes to the node and is in chronological order, which allows for fast updates. The alternative would either be to keep the entire node unsorted, resulting in fast update performance, but poor search performance; or the entire node sorted, resulting in fast search performance, but poor update performance.

Optionally shortcut keys may be used in the large block. This allows a node search to examine only a small part of the entire node, resulting in better performance.

As another, alternative or additional optimization, in embodiments "back pointers" may be included in the small block. These allow to establish order between items in the small and the large block without comparing the keys. This results in an efficient implementation (e.g. in hardware) as it is not necessary to compare the entire keys.

As another optional optimization which could be used together with or independently of the shortcut keys and/or back pointers, in embodiments "order hints" may be included in the small block. Order hints in the small block allow for very efficient hardware to establish the sorted order of items in the small block without comparing values.

Yet another optional optimization is to provide synchronization of complex updates. In this case, when nodes are split or merged, the writer updates the tree by creating a copy (e.g. a thread-private copy) of the sub-tree and then swapping it in with a single pointer update in the page table.

In embodiments, the writer may be implemented in software run on one or more processors, but the reader may be implemented in specialized hardware. The hardware may comprise an FPGA, or a PGA, or even dedicated (i.e. fixed-function) circuitry such as an ASIC (application specific integrated circuit).

Specialized hardware that implements an index data structure is hardware that has dedicated pipelines to execute data structure operations. This is in contrast to general-purpose CPUs that implement an instruction set and execute programs that implement data structure operations using that instruction set. Specialized hardware has several advantages: it has higher throughput per watt, more predictable and lower latency, and can be cheaper than the same functionality running as software on CPUs. The main disadvantage of using specialized hardware is that it is harder to design, it takes more time to build than software, and in the case of dedicated hardware it cannot be changed after it is built, so it is typically used only for very widely deployed functionality. Note however that the scope of the present disclosure is not limited to implementing writes in software and reads in hardware. In other possibilities, the writer could be implemented in some form of hardware such as an FPGA or ASIC, and/or the reader could be implemented in software. Embodiments disclosed herein provided an in-memory B-tree that benefits from the best of both worlds: all operations can be executed in software on the CPU while lookup and scan operations can be executed on the specialized hardware we designed. In many workloads lookups and scans are predominant operations, meaning that most operations benefit from hardware offloads. Lookups and scans are simpler than update operations, meaning that the entire system can be built and deployed faster. In one example implementation the memory may be a DRAM-based host memory, but this is not limiting, and in other examples the B-tree can be stored in, e.g., storage NVM devices such as SSD or 3D-Xpoint drives.

Examples of the above-mentioned techniques will now be described in more detail with reference to the Figures.

The following will be described in terms of a B-tree, but more generally the ideas disclosed herein such as the different types of read and write operations, the use of the large and small blocks, the shortcut keys, the back pointers, the order hints, and/or the synchronization of complex updates (splits and merges), may be applied in any tree structure for storing key-value pairs.

Tree Structure

A key-value store such as a B-tree stores data as key-value pairs (also called items). Items may be of variable size, though depending on implementation, the data structure may place a limit on the total allowed size of an item, e.g. to 512 bytes, or in some implementations may make them a fixed size to simplify implementation. Each key is associated with a single respective value; multiple key-value pairs with the same key are not permitted.

Figure 4:
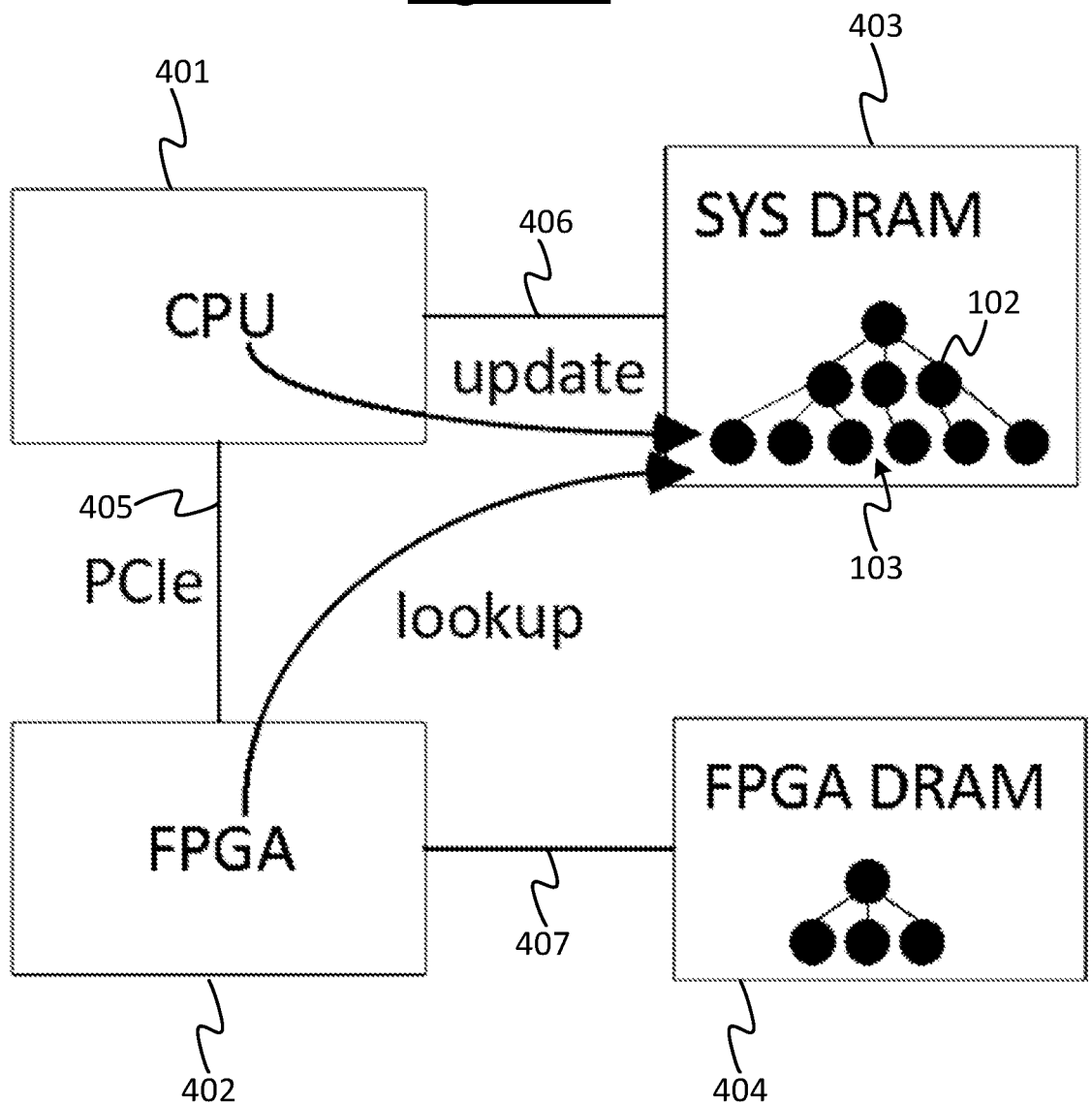
FIG. 4 is a schematic block diagram of a system in accordance with embodiments disclosed herein.
Figure 5:
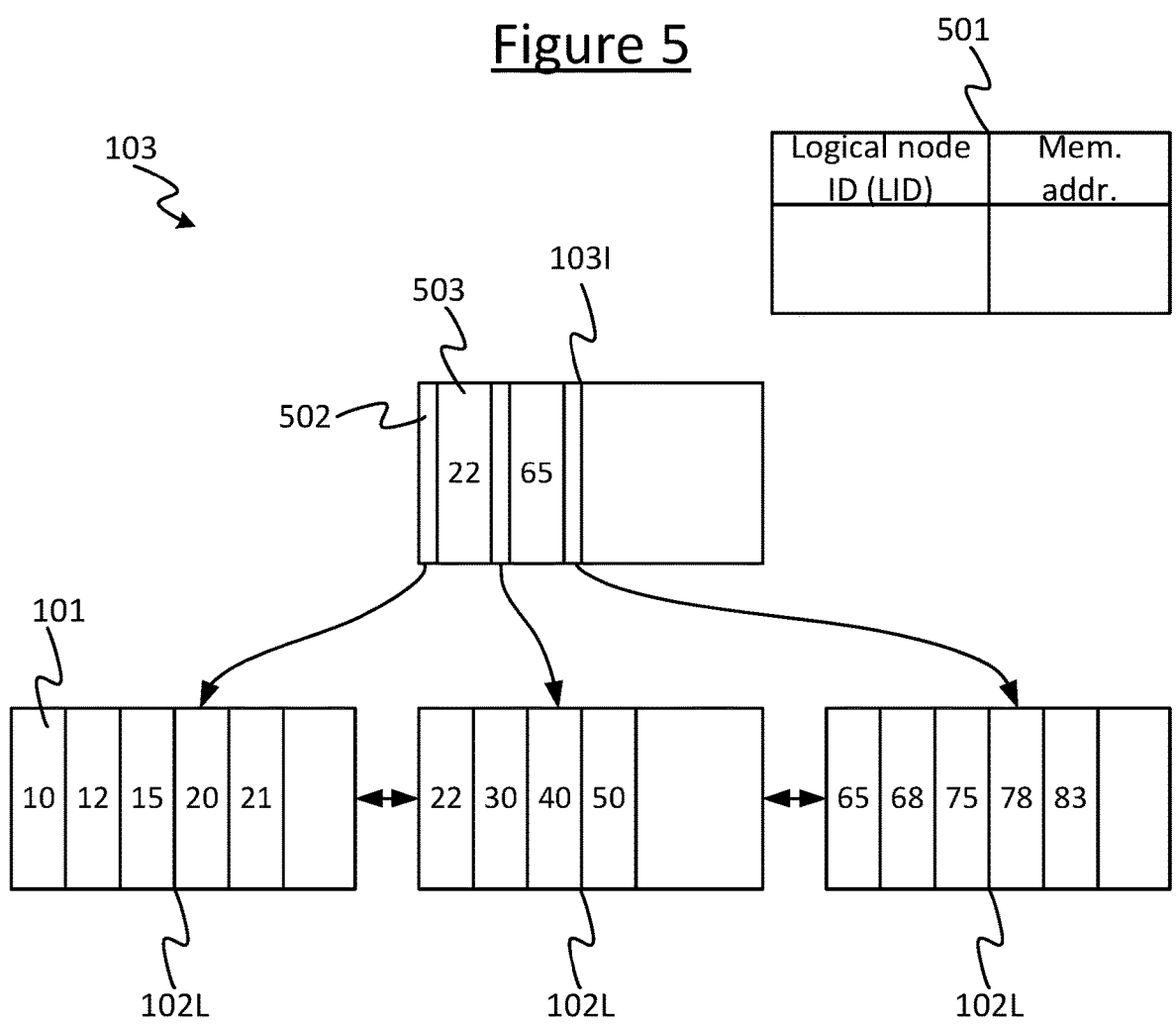
FIG. 5 schematically illustrates a data structure comprising a tree structure.

FIGS. 1, 4 and 5 illustrate, by way of example, elements of a tree structure 103 such as a B-tree. The tree 103 is a form of data structure, implemented in memory, which can be used as a key-value store. The tree 103 comprises a plurality of nodes 102, some of which are leaf nodes 102L and others internal node 102I. Each node 102 has a respective node ID, which may also be referred to herein as the logical ID (LID). Each leaf node 102L comprises a respective set of one or more items 101, each item 101 comprising a key-value pair (by way of illustration FIG. 1 shows a node 102 undergoing a range scan, but this is not limiting and is just one example of a type of read operation). A key-value pair comprises a key, which acts as an index of the item, mapped to a value, which is the content of the item. The numbers shown inside the items 101 in the figures are example keys (in practice the keys may run to much larger numbers but this is just for illustration). Each internal node 102I specifies a respective set of one or more children of the internal node. Once the tree has been built up, at least one or some of the internal nodes will have more than one child each (though when there is only one leaf in the tree e.g. when it is just created, the root node has only one child). Each internal node 102I also indicates which range of keys is encompassed by each of its respective children. The particular scheme shown in FIG. 5 with keys sandwiched between pointers, discussed later, is just one possible example for specifying this mapping. By whatever means the mapping is implemented, the node IDs in the internal nodes 102I thus define edges between parent and child nodes, thereby forming a tree structure. Each internal node 102I is a parent of at least one respective child. Once the tree is built up, at least one or some of the internal nodes are each a parent of multiple respective children (though as mentioned above, when there is only one leaf in the tree the root will have a single child). A child of a given parent may be either a leaf node 102L or another internal node 102I. Leaf nodes 102L are only children, not parents (i.e. the leaves are the bottom of the tree, or put another way the terminus of the tree branches).

For a key to be "encompassed" by a child herein means either that: the child is a leaf node 102 containing the item (key-value pair) with that key; or the child is another internal node 102I that, via its mapping of node IDs to keys, ultimately leads to a leaf node 102I that contains the item with that key one or more levels (or "generations") down the hierarchy of the tree.

One of the internal nodes 102I at the top of the tree is the root node. If a writer or a reader is to write to or read from an item with a particular key, it starts by querying mapping of node IDs to key ranges specified in the root node in order to find which child of the root encompasses the required key. If that child itself is another internal node 102I, the writer or reader then queries the mapping specified in that node to find which child of the next generation encompasses the required key, and so forth, until it finds the leaf node 102L containing the item with the required key. In embodiments key comparison may follow the semantics of the C memcmp function, meaning that integer keys should be stored in big-endian format to maintain integer comparison semantics. However this is just one possible example.

In embodiments the B-tree may take the form of a B+ tree, whereby only leaf nodes 102L contain key-value pairs, and internal nodes 102I only contain node-ID to key-range mappings.

Read/Write Operations

A tree structure such as a B-tree may support read operation types of: individual lookup, and/or range scan. It supports write (update) operation types of: insert, modify, and/or delete. Example semantics of such operations are described below.

Lookup: this takes a key as the argument and returns the value associated with the key if present in the tree. Otherwise, it returns status "not-found".

Figure 2:
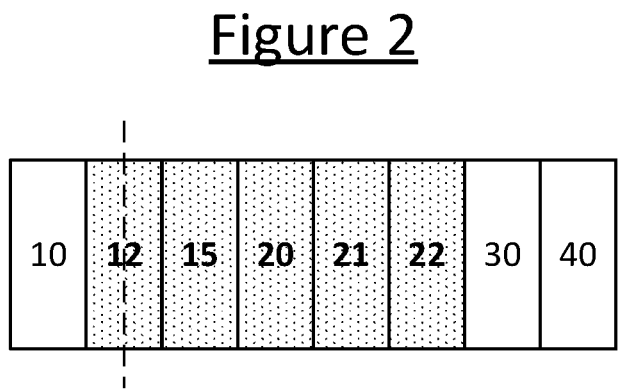
FIG. 2 schematically illustrates range scan in the form of a covering scan for an example key interval [14, 22], whereby the interval formed by the keys of the returned items is the smallest superset that contains the input interval.
Figure 3:
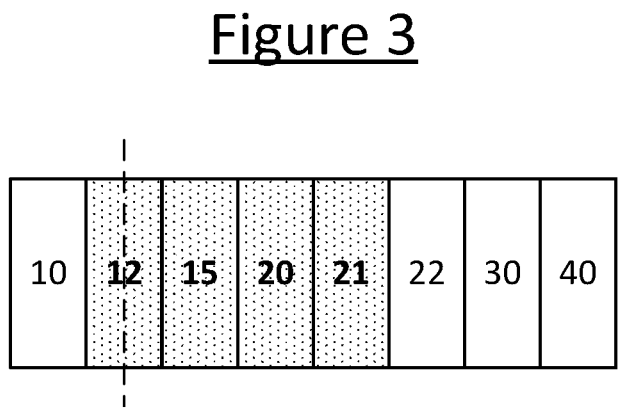
FIG. 3 schematically illustrates range scan in the form of a covering scan for an example key interval (14, 22)

Scan: this takes two keys as the input argument and returns all key-value pairs from the tree with keys in the closed interval [low-key, high-key]. In embodiments two types of scan are supported: inclusive scan and covering scan. FIGS. 1, 2 and 3 illustrate the difference. (1,u) means that lower bound 1 and upper bound u are not included in the result even if they are in the tree. [1, u] means that they are included, if they are in the tree. Combinations [1, u) where 1 is included, but u is not, and (1, u] where 1 is not included but u is are also possible.

With the inclusive scan (FIG. 1), the interval formed by the keys of the returned items is the biggest subset that falls within the input interval. Inclusive scan may be used when serving database queries like "get all items with keys between 36 and 80". The result does not include the items with key 35, even if there is no item with key 36. With the covering scan (FIGS. 2 and 3), the interval formed by the keys of the returned items is the smallest superset that contains the input interval. In the case of FIG. 2, the item with key 22 is returned but in FIG. 3 it is not. The covering scan is useful when querying storage meta-data like "get disk blocks that store data at offset range 550-800 from the beginning of the file". The result includes the highest key before 550 and the smallest key after 800 (i.e. the keys just wither side of the specified range), meaning that all disk blocks that store data in the requested range are returned.

Insert: this takes a new key-value pair to insert. If an item with the specified key does not exist in the tree, the key-value pair is inserted into the tree. Otherwise, the operation does not update the tree and returns status "already-exists".

Modify: this takes an existing key-value pair to update. If an item with the specified key exists in the tree, the value is updated to the value of the input argument. Note that the value can be of different size than before. Otherwise, the operation does not update the tree and returns status "not-found".

Delete: this takes a key of the item to remove. If the item exists in the tree, it is removed. Otherwise, the operation returns status "not-found".

System Architecture

FIG. 4 shows an example system in accordance with embodiments. The system comprises a writer 401, a reader 402, a system memory 403, and optionally a local memory 404 of the reader 402. The tree structure 103 is stored in the system memory 403. The writer 401 and reader 402 are operatively coupled to the system memory 403. For example, the reader 402 may be operatively coupled to the writer 401 via a bus 405 such as a PCIe bus; whilst the writer 401 may be operatively coupled to the system memory 403 via a separate, local or dedicated connection 406 that does not require communication via the bus. The writer 401 may be arranged to access the system memory 403 to write to the tree 103 via the local connection 406, whereas for the reader 402 to read from the tree it may have to access the memory 403 via the bus 405. The reader 402 may be connected to its local memory 404 via a local connection 407 of its own, and may be arranged to thereby cache a part of the tree 103 in the reader's local memory 404.

The memory 403 may take any suitable form and may comprise one or more memory media embodied in one or more memory units. E.g. the memory media may comprise an electronic silicon-based medium such as SRAM (static random access memory) or DRAM (dynamic RAM), EEPROM (electrically erasable and programmable ROM), flash memory, etc.; or a magnetic medium such as a magnetic disk or tape; or even a more exotic form such as a re-writeable optical medium or synthetic biological storage; or any combination of any of these and/or other types. The memory unit(s) in which the memory 403 is embodied could comprise an on-chip memory unit on the same chip as the writer 401, or a separate unit on the same board as the writer 401, or an external unit such as an SSD (solid state drive) or hard drive which could be implemented in the same housing or rack as the writer 401 or even at a different location in a separate housing or rack, etc.; or any combination of these. In one particular embodiment, as illustrated, the memory 403 comprises DRAM which may be implemented on the same board or chip as the writer 401. For instance in one particular example, the system uses DRAM boards that are plugged into the board on which the CPU resides. But this is not limiting.

The reader's local memory 404, if used, may also take any suitable form comprising any suitable medium in any one or more units. In one particular embodiment, as illustrated, the reader's local memory 404 comprises DRAM which may be integrated into the reader 402 or implemented on the same chip or board as the reader 402.

In embodiments, the writer 401 is implemented in software stored in non-transitory computer readable storage of the system and arranged to run on one or more processors of the system, e.g. a CPU; whilst the reader 402 is implemented in hardware, which may take the form of an FPGA, PGA or even dedicated (fixed-function) hardware circuitry, or a combination. The following may be described in terms of such embodiments, but it will be appreciated that for any of the techniques described below it is not excluded that the writer 401 could instead be implemented in hardware and/or the reader 402 in software.

The storage used to store the software of the writer 401 (and/or reader in alternative embodiments where this is implemented in software), may take any suitable form, such as any of those described above, or alternatively a read only memory (ROM) such as an electronic silicon-based ROM or an optical medium such as a CD ROM, etc. The one or more processors may comprise e.g. a general purpose CPU (central processing unit); or an application specific or accelerator processor such as a GPU (graphics processing unit), DSP (digital signal processor), cryptoprocessor, or AI accelerator processor, etc.; or any combination of any of these and/or other kinds.

In one particular embodiment, as illustrated, the writer 401 is implemented in software run on a CPU and the reader 402 is implemented in an FPGA. Embodiments below may be described in terms of such an example, but it will be appreciated that this is not limiting.

The B-tree stores data in system memory 403. In embodiments this allows storing trees as large as the system memory (typically hundreds of GB) but comes at the cost of the reader 402 (e.g. FPGA) accessing system memory over PCIe 405. The reader (e.g. FPGA) 402 may keep a cache of upper levels of the tree in its local memory (e.g. DRAM) 404 to speed up the execution. In one example implementation, the reader 402 records the LID of the root node and the number of tree levels in its local register file.

The B-tree may be designed to allow storing data on secondary storage too, to allow storing even larger trees. Emerging very low-latency NVMe (Non-Volatile Memory Express) devices make this an attractive option even for low-latency scenarios.

In embodiments, the FPGA 402 executes only lookup and scan operations, and update operations are performed by the CPU 401. The synchronization between the CPU and the FPGA is preferably made lightweight. It may require communication over the PCIe bus 405 only when B-tree nodes are split or merged (see section on data structure for more details). Supporting only read operations on the FPGA allows read-dominated use cases to benefit from hardware offload without implementing all operations in hardware.

Data Structure

In embodiments the B-tree 103 is a B+ tree, which means that key-value pairs 101 are only stored in leaves 102L, while internal nodes 102I store key indicators and pointers to child nodes.

FIG. 5 shows an example of a two-level tree, but the principles described here could apply to a tree with any number of levels (i.e. any number of levels of parent and child).

The data structure that comprises the tree 103 further comprises a page table 501. The page table 501 maps the node IDs (also called logical IDs, LIDs) to actual memory addresses where the respective nodes 102 are stored in the system memory 403. This way the writer 401 or reader 402 can locate a node 102 in memory 403 based on its node ID (LID), by looking up the address based on the node ID in the page table 501.

As mentioned, each internal node 102I comprises information mapping each of its child node IDs to an indication of the range of keys encompassed by the respective child. FIG. 5 illustrates one example of how this may be implemented.

Figure 6:
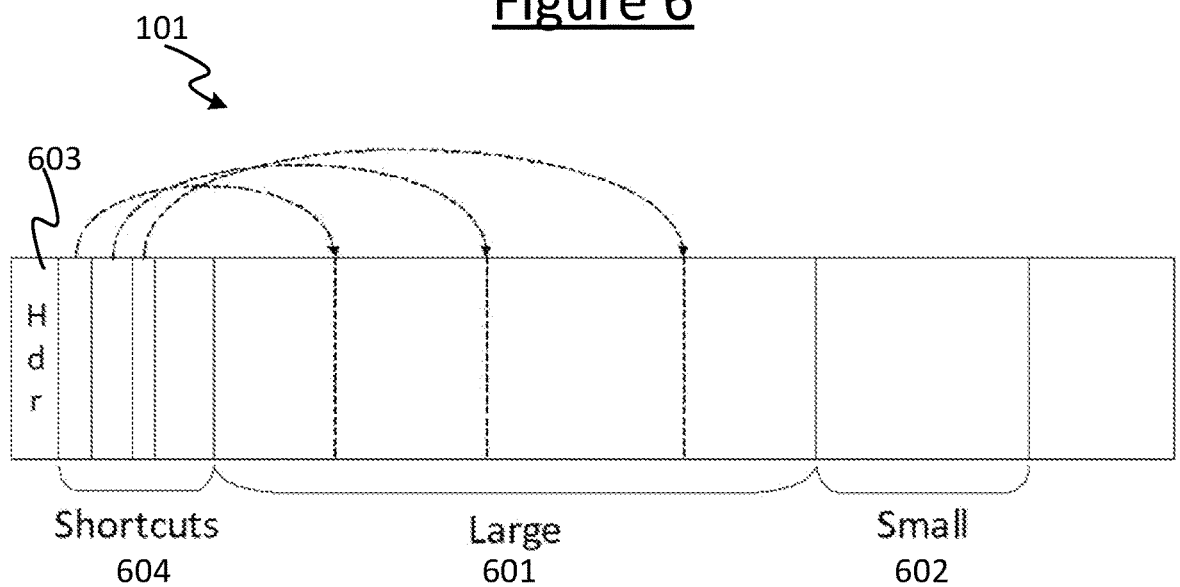
FIG. 6 schematically illustrates a node comprising a small and large block.

In this example, each internal node 102I comprises a set of node pointers 502 and key indicators 503. Each node pointer 502 is a pointer to a child node specified in terms of node ID (logical ID, LID). Each key indicator 502 in this example specifies one of the keys at the boundary of the range encompassed by a child. In each internal node 102I, a pointer 502 with an indicator 503 of key 1 left of the pointer, and key u right of it, points to a subtree that stores keys in the interval [1, u). In addition, each internal node 102I stores a pointer 502 to a subtree with keys that are lower than the lowest key in the internal node. This leftmost pointer is stored in the node's header 603 (e.g. see FIG. 6). In other words each key indicator is sandwiched between a pair of pointers, and the key indicator specifies the boundary between ranges encompassed by the children pointed to by the pointers either side of the key indicator. Put another way, internal nodes store the leftmost child lid. They basically store X keys and X+1 pointers. The leftmost is the +1 pointer. In the particular example shown in FIG. 5, a new item with the key in interval [22, 65) would be inserted in the middle leaf; items with keys less than 22 would be inserted in the leftmost leaf; and keys greater or equal to 65 into the rightmost leaf.

It will be appreciated that the scheme shown in FIG. 5 for mapping children to key ranges is just one example. Another example would be e.g. to store all boundary keys first in the node and then follow them with all LIDs.

In some embodiments, each leaf 102L may also store a pointer to the leaf that is to the left of it and to the leaf that is to the right of it to simplify implementation of range scans.

The B-tree 103 grows from the bottom (as any other B-tree). If during an insert the new item 101 cannot fit into the leaf 102 it maps to, the leaf is split into two. The old leaf's items are split in half and the pointer to the new leaf is inserted into the parent node. If the parent node becomes full, it is also split. The splitting can continue recursively up to the root of the tree. If the root gets split, a new root is created which increases the height of the tree. When a leaf becomes empty because all items were deleted from it, it gets deleted from the parent. Alternatively, another option is to merge the leaves when they become less than half-full to maintain the space invariant of the B-tree.

Node Layout

In embodiments, B-tree nodes 102 may be 8 KB in size, to align them to the DRAM page size. They may be allocated in pinned memory that cannot be moved by the operating system, so as to allow the reader 402 (e.g. FPGA) to access the nodes 102 by using their physical memory address. However this is not essential.

Internal nodes 102I preferably do not store addresses of child nodes directly. Instead, they store logical identifiers (LIDs) for each node. In one example LIDs may be 6 bytes in size, limiting the maximum size of the tree to 2-61 bytes. The mapping from a node's LID to the virtual and/or physical addresses of the node is maintained in a page table 501. The page table 501 may be stored both in system memory 403 and in the FPGA-attached memory 404. When a new node's mapping is created or when a node's mapping is changed, the writer 401 (e.g. CPU) updates the table 501 in system memory 403. If a cache is kept at the reader side, the writer 401 also issues a command (e.g. over PCIe) to the reader 402 (e.g. FPGA) to update the copy of the table in the reader's attached memory 404. Alternatively the reader could poll the tree for updates.

Addressing nodes using LIDs provides a level of indirection, e.g. allowing storage of nodes on NVMe devices. It also helps with synchronizing accesses to the tree, as update operations may perform copy-on-write of nodes in some cases.

In embodiments, the layout of internal nodes 102I and leaf nodes 102L is the same. For example see FIG. 6. The node header 603 may be stored in, e.g., the first 32 bytes of the node 102. The header 603 may contain: a field specifying the type of the node 102 (internal or leaf), the number of used bytes in the node, a lock bit and a node version number to synchronize accesses to the node, and/or several other fields discussed below. In an example such as shown in FIG. 5, the header 603 of an internal node 102I also stores the LID of the leftmost child. The header of a leaf node 102L may store the LIDs of the left and the right sibling. Keys and values may be of variable size, so they may be stored as blobs. Each blob has, e.g., a 2-byte header that specifies its size. LIDs may be stored without a header as their size is known. Values may be stored inline in B-tree nodes 102L to improve sequential access performance. Values larger than 512 bytes may be stored outside of the B-tree 103 and the pointer to the value is stored in the leaf 102L.

Irrespective of the choice of particular implementation parameters such as node size etc. exemplified above, according to embodiments disclosed herein each leaf node 102L comprises two blocks—a large block 601 and a small block 602. To implemented this, a pointer to the boundary between the blocks may be stored in the node's header 603. The pointer may be expressed as an offset relative to the start of the large block 601, for example. The large block 601 stores items in sorted order and the small block 602 stores a log of the recent updates. When the small block 602 becomes larger than a threshold (e.g. set to 512 bytes), it gets merged with the large block 601. By splitting the node 102L into a large and a small block, read operations benefit from accessing mostly sorted data, without the overhead of sorting the node on every update. Entries in the small block 602 may be either newly inserted items or delete markers. As an optional optimization, each entry in the small block 602 may further store a pointer (e.g. 2 bytes long) to an item in the large block 601. As a convenient label this may be referred to as a "back pointer" (though the term "back" is not necessarily meant to limit to any particular direction in the physical address space or such like). In one example implementation, for a newly inserted item 101, the pointer points to the first item in the large block 601 with key greater than the key of the new item added to the small block 602. Or for a delete marker, the pointer points to the deleted item. The pointer may be expressed as an offset within the node 102. It can be used by the reader 402 to establish the order between items 101 in the large and small blocks without comparing their keys, which is a useful optimization, especially if the reading is implemented in hardware.

As another optional optimization, each item in the small block 602 may comprise a field (e.g. 1 byte long) that stores its index in the sorted small block at the time of item's insertion. I.e. this is the order of the item at the time of being inserted. This may be referred to as an "order hint". These indexes are "replayed" by the reader 402 while scanning the small block during the search to rebuild the current sorted order. The order is stored in a temporary "indirection" array of the reader 402, e.g. in FPGA registers, which is used to access the items in the sorted order. This makes the sorting more efficient, especially if implemented in hardware, and doesn't introduce significant latency.

Figure 7:
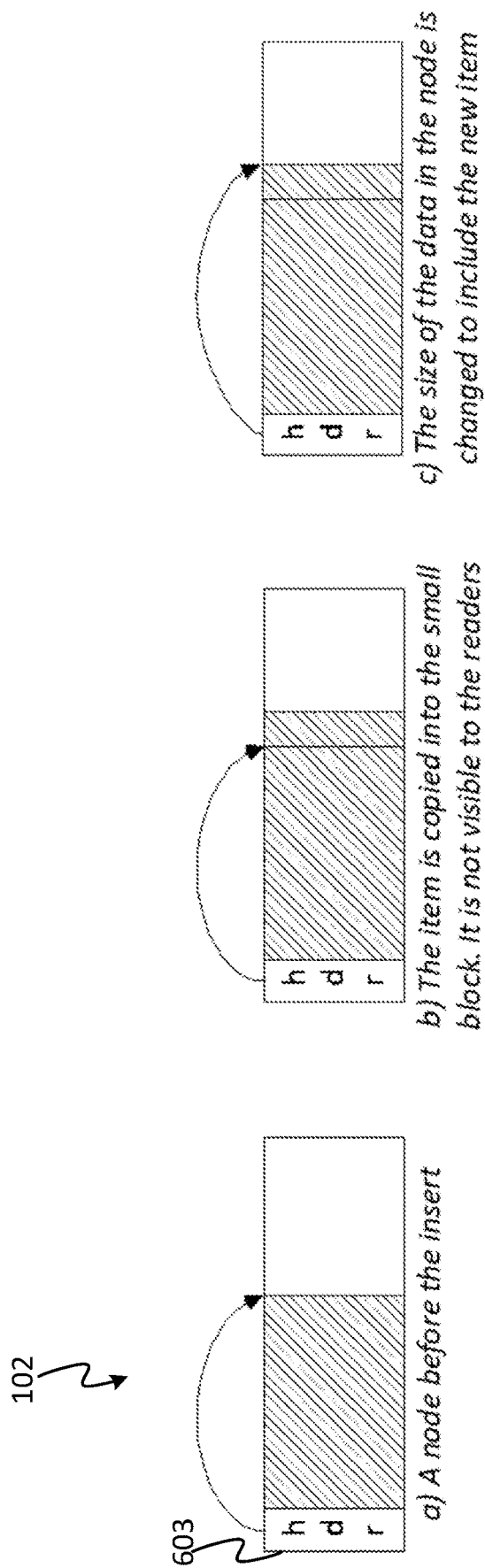
FIG. 7 schematically illustrates a method of inserting a new item into a small block.

FIG. 7 shows an example of the steps to insert a new item 101 into the small block 602. Step a) shows a node 102 before the insert. At step b), the item 101 is copied into the small block 602. It is not yet visible to the reader 402. At step c) the size of the data indicated in the node header 603 is changed to include the new item.

As another optional optimization, to optimize the search for a key in a node, the large block 601 may be divided into segments of roughly equal size. The keys at the boundaries of segments, together with the pointer to the boundary, are stored in a shortcut block 604, which may be stored immediately after the node header 603. The search for a key starts by scanning the shortcut block and identifying the segments that might contain the key. The search examines only those segments and the small block, which reduces the amount of data read from memory. For example, if the performance bottleneck is the PCIe bandwidth between the reader (e.g. FPGA) 402 and the system memory 403, this optimization significantly improves performance. For 32-byte keys and smaller, a search reads roughly 1.5 KB of data from the 8 KB node, resulting in a 5-fold performance improvement over a more straightforward implementation that scans the entire node. The shortcut keys may be selected during the merge of the large and the small block 601, 602.

Node Cache

The FPGA 402 may have several gigabytes of DRAM 404 attached directly to it (e.g. 4 GB). This memory may not be big enough to store the entire B-tree 103 in all use cases, but it may be big enough for the first several levels, so in embodiments it may be used as a cache to reduce latency and increase throughput of the B-tree. For instance, the cache 404 may be allocated at, e.g., the 8 KB node granularity to reduce the amount of meta-data, but data may be fetched in 256-byte chunks, to reduce the amount of unwanted data read over PCIe 405. The FPGA 402 may keep a 32-bit occupancy bitmap for each cached node 102 to keep track of the chunks that are in the cache 404. The consistency of pages between the cache 404 and system memory 403 may be maintained by invalidating cached pages whenever a page mapping is updated. Software on the CPU 401 may send the page table update command over PCIe 405 when a page mapping is updated, and the FPGA 402 may invalidate the page by clearing the occupancy bitmap.

Page Table

The reader 402 (e.g. FPGA) may maintain a local copy of the page table 501 stored in its local memory 404, e.g. DRAM, which may be attached to the FPGA device 402 for example. In embodiments each entry in the table is 8 bytes in FPGA memory, but 16 bytes in system DRAM. This is because in embodiments the copy in system DRAM stores two addresses (virtual and physical) and the copy in FPGA DRAM memory stores one address (only physical).

Entries in the page table 501 store the memory address of the nodes 102 mapped to their respective LIDs. In general these could be physical or virtual addresses depending on implementation. In embodiments the writer employs virtual memory mapping and the page table 501 at the writer side stores the virtual addresses of the nodes mapped to their respective IDs. In embodiments where a copy of the page table is kept in the FPGA 402, entries in the FPGA page table copy may store the physical address of the nodes mapped to their respective LIDs. E.g. with an 8-byte entry and 4 GB of DRAM, the system supports trees up to 4 TB, which is large enough for main memory trees on today's servers. Larger trees may be supported by having the reader 402 (e.g. FPGA) access the page table 501 in system memory 403 or an NVMe device, or by increasing the B-tree node size.

The page table 501 is not absolutely essential in all possible embodiments. A less preferred alternative would be to use memory addresses directly as node pointers in the internal nodes 102I.

Look-Up

A lookup starts at the root and traverses the internal tree nodes 102I at each level to find the pointer to the node 102 at the next level. Each lookup terminates at a leaf 102L. If the leaf contains the key, it returns the associated value. Otherwise, it returns the status indicating that the key is not stored in the tree.

When accessing an internal node 102I, the lookup may initially fetch a first portion (e.g. the first 512 bytes) of the node 102, which contains the node header 603 and the shortcut block 604. The lookup starts by searching the shortcut block 604 to find the last key that is less than or equal to the target key. It follows the pointer of the shortcut item to find the segment of the large block 601. The search fetches the large segment from memory and searches it to find the last key that is less than or equal to the target key. Next (or in parallel), the lookup fetches the small block 602 from memory and searches it for the last key that is less than or equal to the target key. If back-pointers are used, the lookup follows the pointer stored in the larger of the items 101 found in the small and the large block without comparing the keys—if the back pointer of the small block item points just after the large block item, it follows the pointer in the small block; otherwise, it follows the pointer in the large block. If the target key is smaller than both the first key in the large block and in the small block, the lookup follows the leftmost pointer.

When the lookup reaches the leaf 102I, it searches it in a similar fashion to the internal nodes. The main difference is that it looks for the exact match in the small and the large block, meaning there is no need to order the items in the large and the small block.

Small block search: the search of the small block 602 may start by sorting the items 101 before inspecting them. By sorting, the search of the small block can stop as soon as it encounters the first item with key greater than the target key. In embodiments, the small block sorting does not compare keys. Instead, it uses the order hint field stored in each small block item to establish the ordering. The order hint field stores the item's index in the sorted small block at the time of item's insertion. The indexes are "replayed" while scanning the small block to rebuild the current sorted order. The established order is stored in a temporary indirection array, e.g. in FPGA registers, without copying items. The indirection array is used to access the items in the sorted order. The sorting doesn't introduce significant latency, especially in hardware, and it may be performed in parallel while searching the shortcut block 604 and large block 601. In software, the sorted order may be kept in a small indirection array.

Figure 8:
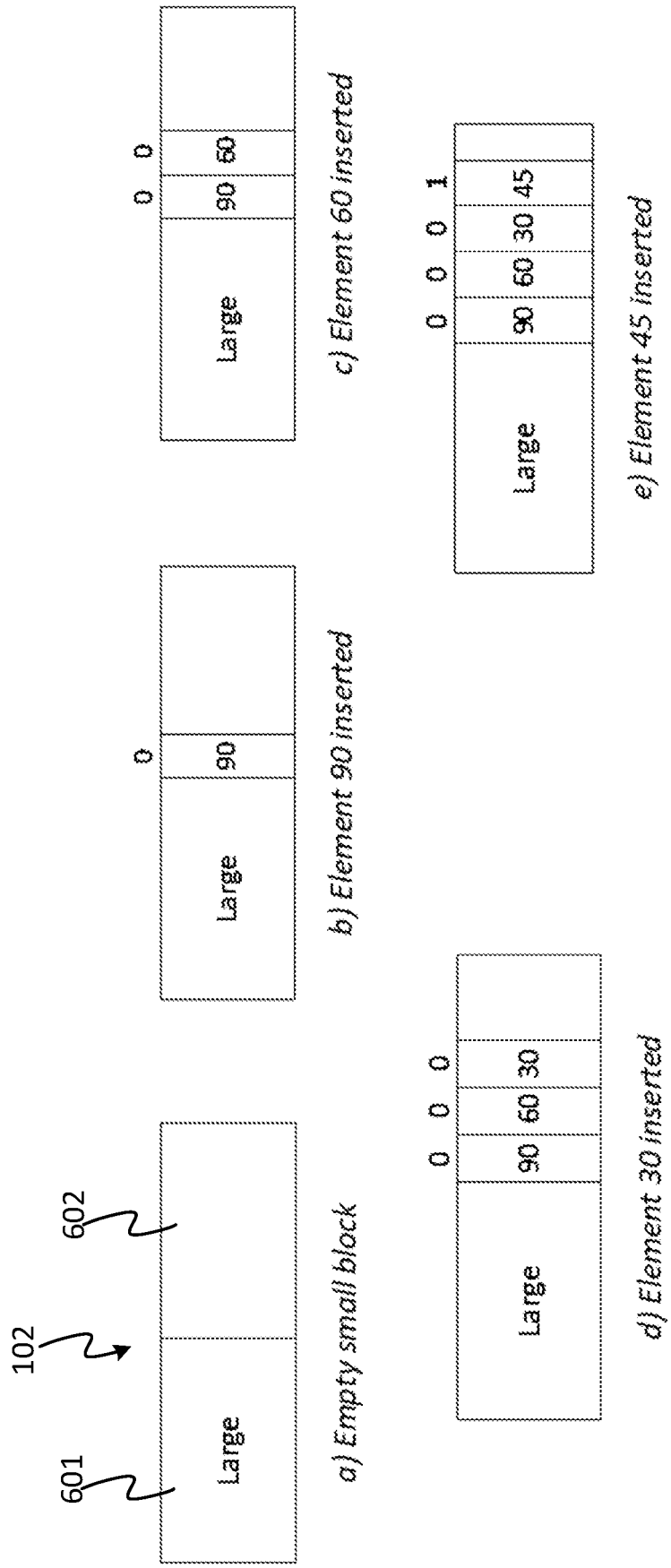
FIG. 8 schematically illustrates a method of including order hints to sort a small block.

FIG. 8 illustrates an example sequence of insertions into a node 102. The number shown in each item 101 represents its key. The elements in the large block 601 are omitted for clarity. The number above the item represents its order hint. At step a) the small block 602 in the node is initially empty. At step b), by way of example, an item with key 90 is inserted and it is assigned order hint 0 as it is the first item in the small block. Next at step c), an item with key 60 is inserted. It is the smallest item in the small block, so it is assigned order hint 0. The order hint in the existing items is not changed. The order hint is determined from the sorted order of the small block, which is established before inserting a new item. Next, at step d), an item with key 30 is inserted. It is again the smallest in the small block, so its order hint is also 0. At step e) the final item's key is 45 and its order hint is 1.

Figure 9:
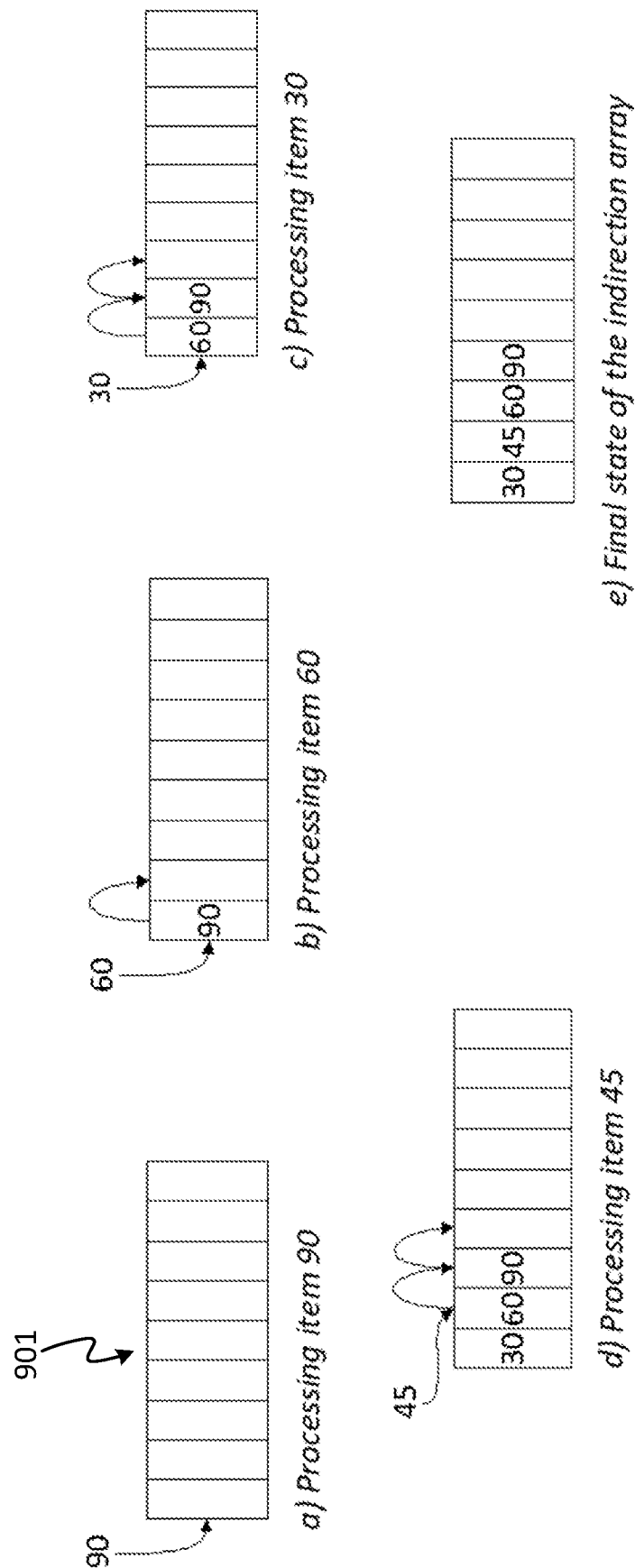
FIG. 9 schematically illustrates a method of sorting a small block based on order hints.

FIG. 9 illustrates the sorting the small block 602. The figure shows the state of the indirection array 901. The indirection array stores offsets of items in the small block, but in the figure each offset is represented by its key for illustrative purposes.

To sort the small block 602, items 101 are processed in the order in which they are stored, and their order hint is used to sort the items in the indirection array. The indirection array 901 stores items' offsets in the small block. When an item with order hint i is processed, its offset in the small block is inserted into position i in the indirection array. All the items at positions j≥i are moved to the right. After the entire small block is processed, the indirection array contains offsets of the items in the sorted order. FIG. 9 illustrates indirection array sorting for the small block shown in FIG. 8. In one implementation each step in the figure completes in a single cycle on the FPGA, in parallel with key comparison. In the first step a), item 90 is inserted into the first slot. In the next step b), all the items are moved to the right and item 60, with order hint 0, is inserted in the first slot. In the next step d), all the items are again moved to the right to make room for item 30 with order hint 0. In the final step d), items 60 and 90 are moved to the right and item 45, with order hint 1, is inserted into the slot with index 1. The final state e) shows the state of the indirection array after steps a)-d).

Figure 10:
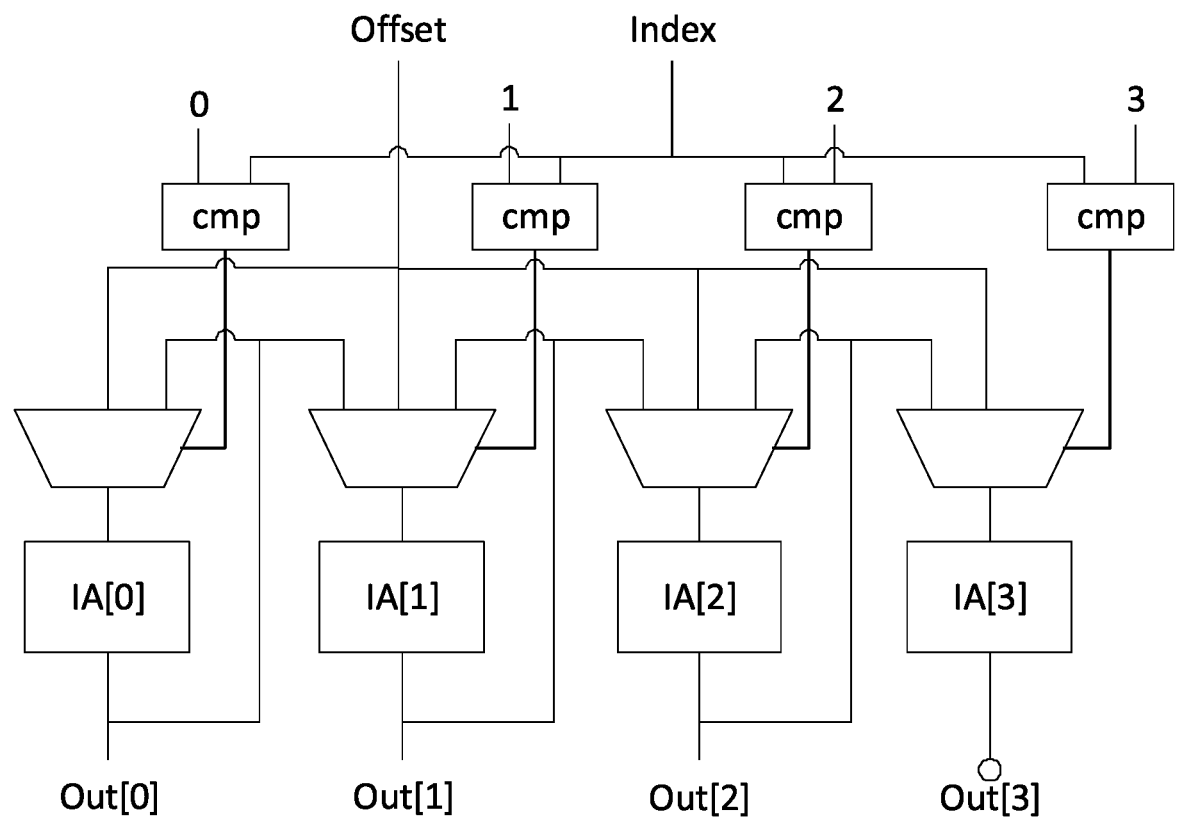
FIG. 10 is a schematic circuit diagram of a four-element small block sorter.

FIG. 10 shows an example implementation of the indirection array sorter. It shows a 4-item wide array. The sorter comprises 9-bit wide registers. The input to a register is either its output, the output of the register to the left of it, or the input offset value. The register input is selected by comparing the input index to the (constant) index of the register. If they are equal, the input offset is selected; if input index is less than the register's index, the output of the register to the left is selected; if input index is greater, the register's output is written to itself. This example implementation does not cover the case of having delete items in the small block, but to accommodate that the input to a register can be adapted so as to also take the output of the register to the right of it.

It will be appreciated of course that the layout shown in FIG. 10 is just one possible hardware implementation and a person skilled in the art may be able to design others using conventional design tools once given the disclosure herein. Also a software implementation on the read side 401 is also possible.

The implementation of sorting on the CPU 401 may follow a similar approach. The indirection array is small, and it comfortably fits into an L1 cache, so the operation is fast. The main difference is that it takes multiple cycles to move the items in the array to the right.

Range Scan

A range scan operation traverses the tree 103 from the root, as described above, to find the start key of the target range. Then it scans forward from the start key, until it reaches the end key of the range or the end of the tree.

In embodiments, to move between leaves 102L, the range scan may use sibling pointers. In such embodiments, each leaf 102L holds a pointer to its left and right siblings, making it possible to perform the range scan in both directions. The use of sibling pointers however is not essential. If sibling pointers are not used, then the scan instead goes back up the tree to find the next leaf. In most cases, it can just look at the first parent and take the next sibling's LID. But if it has gone to the end of the parent, it will go to its parent in order to find its sibling. The scan might have to go up all the way to the root The range scan returns items 101 sorted by their keys. To keep the items sorted, the scan of a leaf 102L may process the large and the small block 601, 602 together. In a covering scan, the scan first finds the item with the highest key that is smaller or equal to the start of the range in both large and small block. A "standard" inclusive scan is similar except it would start from the lowest key that is greater or equal to the start of the range. Either way, the scan then scans the node forward both in the large and the small block looking for the end of the interval and returning items that are in the interval. When an item with a key greater than the right boundary is found in both the large and the small block, the scan stops. While scanning, if both the next small and the next large item are in the interval, the search may decide which to return next using the back pointer in the small item: if the small item points to the large item, the small item is returned and the search moves to the next small item; otherwise, the large item is returned, and the search moves on to the next large item. To handle shortcut keys 604, the scan may keep track of the end of the current large segment. In this case, at the beginning of the next segment, the key is retrieved from the shortcut block and the value from the large block. In the middle of a segment, the key and the value are in the large block.

Insert

An insert operation starts with a tree traversal to find the node 120L in which to insert the new item 101. The traversal is similar to a traversal during the lookup. A difference is that in embodiments it reads all items, regardless of their version, in order to implement the semantics of insert and modify operations. Before updating the node, the writer 401 may lock it with a write lock, ensuring that the state of the node is the one observed during the traversal (note that in embodiments the memory 403 may support different types of lock, write locks and read locks, and the use of a write lock does not necessarily imply the use of a read lock). E.g. the write lock may be stored in a 32-bit lock word in the node's header, wherein the lock word consists of the lock bit and a 31-bit node sequence number, which is incremented when the node gets updated. The writer 401 may acquire the write lock by atomically setting the lock bit using an atomic compare-and-swap instruction on the lock word, while keeping the sequence number the same as during the traversal. If the compare-and-swap succeeds, this means that the node has not changed since the traversal, so the insert can proceed. If the compare-and-swap fails, the node has changed since the traversal, so the writer retries the operation by performing the tree traversal again.

Fast-path insert: in one common case, the insert does not require splitting the node 102L or merging the large and the small block 601, 602. This common-case insert may be performed in place (FIG. 7). The writer 401 atomically appends the new item by first copying it after the end of the small block 602 and then adjusting the size of the small block to include the new item 101. To do this, the writer 401 may perform the following steps after acquiring the write lock: it copies the item to the small block after acquiring the lock; updates the node's size; increments the node's sequence number; and unlocks the node. In embodiments the lock word and the size of the small block in the header may share the same 64-bit word, so the writer 401 may increment the node version, updates the node's size, and releases the lock with a single instruction. Concurrent readers do not observe the new item while it is being copied, because it is stored beyond the end of the small block as currently specified in the header 603. They either observe the node without the item or with the item fully written.

In embodiments the reader 402 (e.g. FPGA) does not cache leaf nodes 102L. If it did, the writer 401 would have to invalidate the cache 404 by issuing commands over PCIe 405, which would introduce additional overheads to the common case insert.

Figure 11:
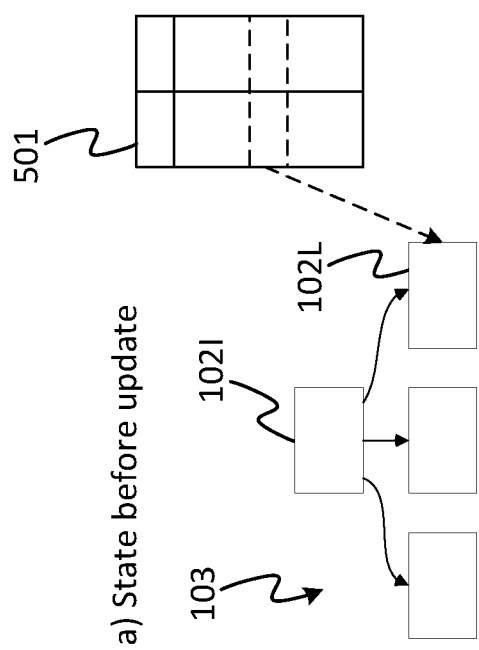
FIG. 11 schematically illustrates a method of merging a large and small block during an insert operation.
Figure 11:
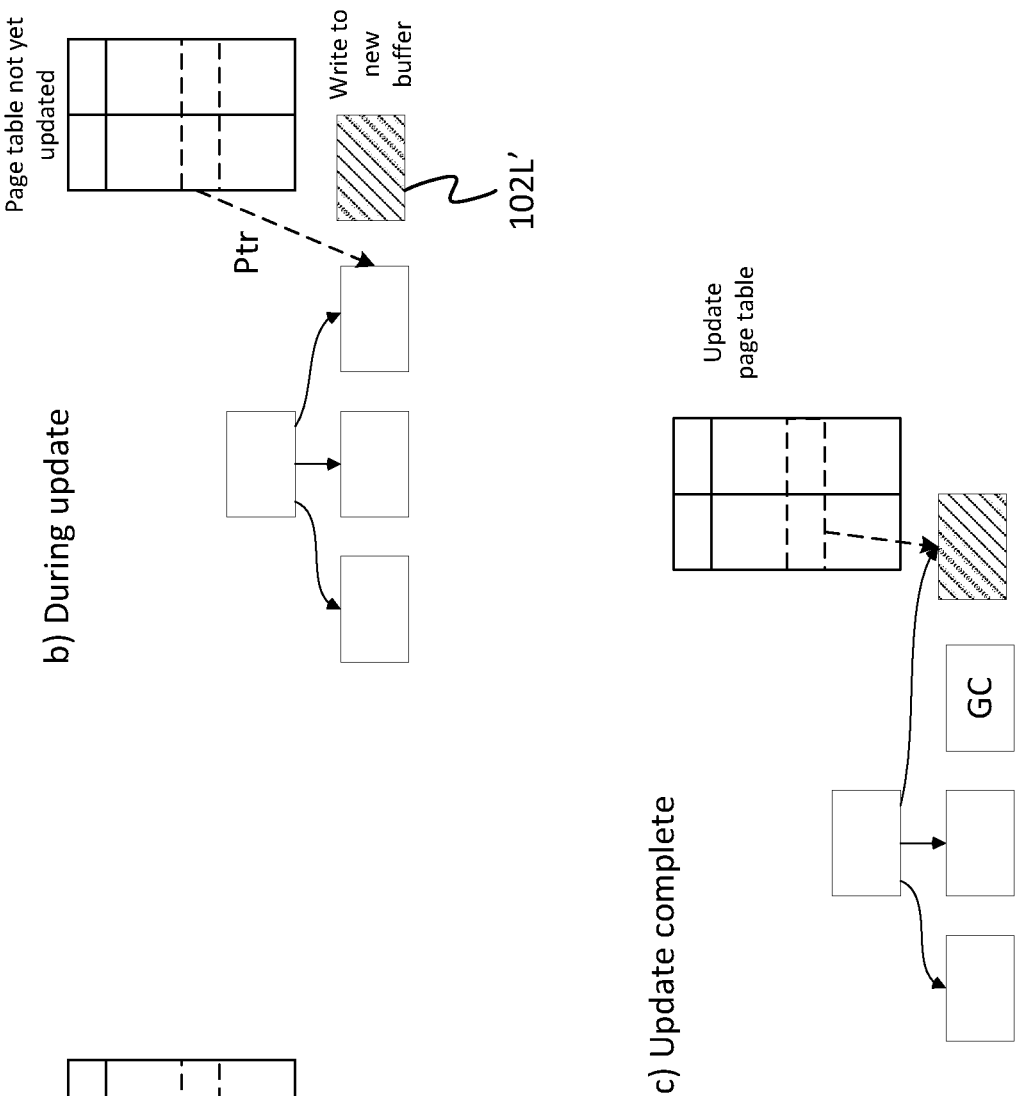

Large-small merge: if the small block 602 becomes too large, the writer 401 merges the large and the small block 601, 602 (see FIG. 11). It allocates a new memory buffer for the node 102L and sorts all the items 101 in the node into a large block in the new buffer. In embodiments, the new item is added to the merged large block (rather than a new small block). I.e. the new node's small block is empty after a merge. In principle it could be done the other way (i.e. the new item is the first item added the new small block), but storing the new item in the large block immediately results in slightly fewer large-small merges over time.

In embodiments that use shortcut keys 604, the writer 401 selects the shortcut keys while sorting the items (it selects them at that point as the large block is immutable). For each processed item, the writer 401 decides whether to put it into the shortcut or the large block based on, e.g., the number of bytes copied so far, the remaining bytes to copy, and/or the average size of the key and the value. It preferably maximizes the number of shortcut keys while keeping the large block segments similarly sized.

When all the items are copied in the new buffer, the writer 401 atomically replaces the mapping of the node's LID in the page table 501 with the address of the new buffer. To update the LID mapping, in embodiments the writer 401 updates the LID entry in both the CPU and the FPGA copy of the page table. It acquires a software lock on the LID entry, issues a page table update command to the FPGA, and releases the software lock after the FPGA command is completed. The parent node does not need to be changed because the LID of the node remains the same. Finally, the writer puts the old memory buffer into the garbage collection list, unlocks it, and sets the "deleted" flag in its header to ensure that concurrent writers do not update the old buffer. Ongoing operations can still read from the old buffer, but if an operation needs to update a deleted node, it retries. On retry, it will use the new node mapping.

The garbage collection used may be any suitable scheme, such as standard explicit garbage collection for concurrent systems, e.g. RCU, epoch-based memory manager, or hazard pointers. FIG. 11 shows an example of the merging of the large and small block during an insert operation. The insert of a new item into a node 102L would cause the small block 602 to exceed its maximum size and so the small block will now be merged into the large block 601, along with the new item. Step a) shows the tree 103 before the insert into the right-most node 102L. Step b) shows the allocation of a new buffer and merging into it. The old pointer (dashed line) to the node is inserted. At step c) the page table is updated to point to the new buffer, and the old buffer is placed into the garbage collection (GC) once it is not needed by any operations in progress.

A benefit of this approach is that complex updates such as merges can be performed without having to place a read lock on the old instance of the node in the original memory address (though some operations may still use write locks, which only prevent multiple writers, but allows one writer and one or more readers to access the node). If the reader 402 tries to read the node 102L while the writer 401 is updating it in the new buffer but before the page table is updated, the reader 402 simply reads the old instance from the existing memory address as currently specified in the page table 501. Once the write to the new buffer (i.e. new memory location) is completed, the writer 401 can then quickly update the page table 501 to switch the respective page-table entry for the node's LID to the new memory address. In embodiments this can be done in a single atomic operation. Any subsequent reads will then read the new instance of the node from the new address based on the updated page table entry. A similar approach can be used for other complex updates such as node splitting or node merging.

When a new memory buffer is allocated for a LID, its sequence number can safely be set to 0 because it is made sure that the buffer is unreachable by any operation before deleting and reusing it. Taking some example sizes by way of illustration, if the large and the small block 601, 602 are merged when the small block becomes bigger than 512 bytes and the size of small block entries is at least 10 bytes (the delete entry size is 10 bytes, the insert entry size is at least 13 bytes), then the maximum version of the buffer is 41, meaning that the 31-bit sequence number never wraps around. In fact in one implementation the smallest size is actually 6 bytes on average, but even with 1-byte entries the sequence number will not overflow.

Node Splitting

If there is not enough space in the leaf 102L for the insert, the writer 401 splits the leaf into two, and inserts a pointer to the new item into the parent (FIG. 12). If the parent is full, the writer 401 also splits the parent. The splitting can propagate in this way up to the root. The internal node 102I that is updated, but not split is called the root of the split. The writer replaces the entire subtree below the root of the split by updating the mapping of the root of the split in the page table 501. Before updating any data, the writer may acquire write locks on all nodes 102 that are getting updated by the operation (these are the locks to prevent other writers from interfering). If locking fails because of a node version mismatch, the writer releases all acquired write locks and restarts the operation. The writer also allocates all required memory buffers to complete the operation. It allocates two new nodes (with a new LID and a new buffer) for each node that it splits and a memory buffer for the root of the split. If memory allocation fails because system is out of memory, the writer may give up and returns the appropriate status code to the caller. After acquiring any locks and allocating memory, the writer processes the nodes from the leaf up, splitting them into newly allocated buffers. Each of the two nodes resulting from the split ends up with roughly half of data from the original node. The writer merges the large and the small blocks while splitting. When it gets to the root of the split, the writer copies it into a new memory buffer. It modifies the new buffer to include pointers to the new child nodes and the key at the boundary between nodes. To swap the two subtrees, the writer updates the mapping of the root of the split in the page table with the address of its new memory buffer. Swapping the subtree in this way ensures that readers either observe the old or the new subtree. The writer then puts memory buffers of all nodes that got split, their LIDs, and the old memory buffer of the root of the split into the garbage collection list. Finally, it unlocks all memory buffers and marks them deleted.

FIG. 12 shows an example of splitting a node during insert. Dashed boxes represent newly allocated node buffers. Filled boxes represent new nodes with a new LID and a memory buffer. Step a) shows the tree 103 before the split. The rightmost node is getting split. The root of the split is the root of the tree. At step b), two new nodes are allocated for the split, and a new buffer for the root of the split. At step c), the mapping of the root of the split is updated and nodes put into the garbage collection (GC) list.

In embodiments, the writer also updates the sibling leaf pointers, which are used during the scan operation. It locks the sibling leaves and updates the pointers after it swaps in the new subtree. Even though the sibling pointers and the root of the split may not be updated atomically, the readers observe a consistent state of the tree.

If the root of the tree cannot fit a new item, the writer splits it and creates a new root, increasing the tree height. The writer executes the splits as above, except it allocates a LID and a memory buffer for the new root instead of just the memory buffer for the root of the split. It initializes the new root with the leftmost pointer set to the left half of the old root and a single item that points to the right half of the old root. It may then send a command to the reader (e.g. FPGA) to update the root and the tree height. In one example implementation, the reader 402 records the LID of the root node and the number of tree levels in its local register file, and not in the cache 404. The data copy in the cache, e.g. older root node, will be eventually invalidated when its LID is reused for another physical node, or will be possibly evicted because old data will not be accessed after a short while. So the cache just needs to focus on maintaining the consistency of the cached node data.

Delete

Deleting an item 101 is analogous to inserting a new item. The writer 401 inserts a delete entry into the small block 602. The entry points to the item it is deleting, so the deleted item is ignored during lookup operations. During the merge of the large and the small block 601, 602, the space occupied by deleted items is reclaimed. If a node 102 gets empty, it is deleted. The node deletion can proceed from the leaf 102L up the tree 103 similarly to the node split. In embodiments its atomicity is ensured using the same techniques described above.

Modify

A modify operation may be performed as a combination of an insert and a delete. The writer 401 appends a delete entry for the old item and a new item to the small block 602 and publishes them atomically by updating the node's header 603.

CONCLUSION

It will be appreciated that the above embodiments have been described by way of example only. More generally, according to one aspect disclosed herein there is provided system comprising: memory storing a data structure, the data structure comprising a tree structure which comprises a plurality of nodes each having a node ID, with some nodes being leaf nodes and others internal nodes wherein each internal node is a parent of a respective set of one or more children in the tree structure, each child being either a leaf node or another internal node, and each leaf node being a child but not a parent, and wherein each of the leaf nodes comprises a respective set of one or more items each comprising a key-value pair, and each of the internal nodes maps the node ID of each of its respective children to a range of keys encompassed by the respective child. The system further comprises: a writer arranged to write items to the leaf nodes; and a reader arranged to read items from the leaf nodes. Each of the leaf nodes comprises a respective first block and a respective second block, the first block comprising a plurality of the items of the respective leaf node sorted in an address space of the memory in order of key. The writer is configured so as, when writing new items to the tree structure, to identify which leaf node to write to by following the mapping of keys to node IDs through the tree structure, and to write the new items to the second block of the identified leaf node in an order in which written, rather than sorted in order of key. The reader is configured so as, when reading one or more target items from the tree structure, to determine which leaf node to read from by following the mapping of keys to node IDs through the tree structure, and then to search the determined leaf node for the one or more target items based on a) the order of the items as already sorted in the first block and b) the reader sorting the items of the second block by key relative to the items of the first block.

In embodiments the writer may be implemented in software stored in computer-readable storage of the system and arranged to run on one or more processors of the system. In embodiments the reader may be implemented in a PGA, FPGA or dedicated hardware circuitry. However alternatively the writer may be implemented in hardware and/or the reader may be implemented in software, or either may be implemented in a combination of software and hardware.

In embodiments the tree structure may take the form of a B-tree; e.g. a B+ tree whereby items are not stored in the intermediate nodes.

In embodiments, in at least some of the leaf nodes and/or internal nodes, the respective first block may be divided into segments and the may node further comprise a shortcut block comprising a plurality of shortcuts, each shortcut comprising i) an indication of the key at the boundary of a corresponding segment of the respective first block and ii) an offset to the corresponding segment within the leaf node. In such embodiments, the reader may be configured so as, when performing said searching of a first block, to use the shortcuts to search only segments which might contain the one or more items based on key.

In embodiments the writer may be configured to include upon writing, when writing to at least one of the leaf nodes, a back pointer associated with each item in the respective second block, each back pointer comprising an offset to an item in the first block with a next larger or next smaller key compared to the associated item in the second block. In such embodiments the reader may be configured so as, when performing said sorting of a second block, to use the back pointers to sort the items of the second block by key relative to the respective first block.

In embodiments, the writer may be configured to include upon writing, when writing to at least one of the leaf nodes, order hints which indicate, for each of the items in the second block: an order of the item's key relative to the current keys in the second block at a time of writing the item to the second block. In such embodiments the reader may be configured so as, when performing said sorting of a second block, to use the order hints to sort the items of the second block by key relative to the respective first block.

For example, the reader may be configured to use the order hints by: processing the items in the respective second block in the order in which they are stored; and using the order hints to sort the items in an array, wherein the array stores offsets of the items within the second block. When each item with order hint i is processed, its offset in the second block is inserted into position i in the array, and all the items at positions j≥i are moved to the right, such that after the entire second block is processed, the array contains offsets of the items in the sorted order.

In embodiments, the data structure may comprise a page table mapping the node IDs to respective memory addresses. In this case the reader is configured so as, when reading from a node of a determined node ID, to use the page table to determine the memory address of the determined node in memory. In some such embodiments, the writer may be configured so as, when updating a node in order to write, split or merge the node, to write an updated version of the node to a new memory address, and then once written, update the respective memory address in the page table so as to point to the new memory address.

In embodiments, each second block may have a maximum size. The writer may be configured so as, if writing a new item that would cause the respective second block of the identified node to exceed the maximum size, to merge the second block with the respective first block.

In embodiments where the data structure comprise a page table mapping the node IDs to respective memory addresses, the writer may be configured so as, when updating a node in order to merge the respective second and first block, to write an updated version of the node including the merge to a new memory address, and then once the merge is completed, update the respective memory address in the page table so as to point to the new memory address.

In embodiments each leaf node may further indicate the node IDs of one or more sibling leaf nodes that encompass a range of keys neighbouring the keys of the respective leaf node. Also, the reader may be configured to perform a range scan to read items from a range of keys. In such embodiments the reader may be configured so as, when performing a range scan that reads from a range of items spanning more than one leaf node, to: determine one of the leaf nodes encompassing one of the keys in the scanned range by following the mapping of keys to node IDs through the tree structure, then determine at least one other leaf node encompassing at least one other key in the scanned range by using the ID of at least one of the sibling leaf nodes as indicated in said one of the leaf nodes.

According to another aspect disclosed herein there is provided a method comprising the operations of the memory, writer and/or reader in accordance with any embodiment disclosed herein. According to another aspect there may be provided a computer program embodied on a non-transitory computer readable medium or media, comprising code configured so as when run on one or more processors to perform the writing of the writer and/or the reading of the reader. Other variants or applications of the disclosed techniques may become apparent to a person skilled in the art once given the disclosure herein. The scope of the present disclosure is not limited by the described embodiments but only by the accompanying claims.

The invention claimed is:

1. A system comprising:
 a memory having an address space and storing instructions that are executable by a processor;
 the memory storing a data structure, the data structure comprising a tree structure, the tree structure comprising;
  a leaf node comprising a node ID, a first block, a second block, and a pointer to a boundary between the first block and the second block,
   the first block being a large block having a larger maximum size than the second block and storing an item, the item sorted into a sort order in an address space based on a key, and the second block being a small block and storing a recent update to the leaf node in chronological order, the recent update comprising an updated key;

the processor configured to execute the instructions stored on the memory, the instructions comprising performing operations comprising;

writing a new item, the new item comprising a new key within a range of keys and a new value, to the leaf node of the tree structure, writing the new item comprising:

determining the leaf node to write the new item to, by following a mapping to the node ID of the leaf node having the range of keys, writing the new item to the second block of the determined leaf node in chronological order;

reading a target item having a target key within the range of keys from the leaf node of the tree structure, reading the target item comprising:

determining the leaf node to read the target item from, by following the mapping to the node ID of the leaf node having the range of keys, searching the determined leaf node for the target item based on:

(a) the sort order of the first block; and (b) sorting by the updated key a log of recent updates of the second block relative to the key of the item of the first block; and wherein the first block being sorted and the second block comprising the recent update enables both fast update performance and fast search performance.

2. The system of claim 1, further comprising a cache, the cache configured to store a portion of the tree structure.

3. The system of claim 2, wherein the cache reduces a latency and increases a throughput of the tree structure.

4. A method comprising:

storing a data structure in a memory having an address space, the data structure comprising a tree structure, the tree structure comprising a plurality of nodes, each node having a node ID, with some nodes of the plurality of nodes being leaf nodes and other nodes of the plurality of nodes being internal nodes, each internal node being a parent of one or more children in the tree structure, each child of the one or more children being either a leaf node of the leaf nodes or anther an internal node of the internal nodes, and each leaf node being a child but not a parent, each leaf node of the leaf nodes comprises one or more items, the one or more items each comprising a key and a value in a key-value pair; and each internal node of the internal nodes maps the node ID of each of the respective children of the internal node to a range of keys encompassed by the respective each child of the internal node;

each leaf node comprising a first block, a second block, and a pointer to a boundary between the first block and the second block, the first block being a large block having a larger maximum size than the second block and storing the one or more items, the one or more items sorted into a sort order in the address space based on the key of each item, and the second block being a small block and storing a log of recent updates to the leaf node in chronological order, the recent updates being to the one or more items stored in the first block, the first block being sorted and the second block comprising the log of recent updates enabling both fast update performance and fast search performance;

writing new items to the leaf nodes of the tree structure, each item of the new items comprising a new key within the range of keys and a new value, the writing comprising:

determining the leaf node of the leaf nodes to write each new item based on the mapping to the node ID of the leaf node within the range of keys, writing each new item to the second block of the determined leaf node in chronological order, the new item being a recent update to the first block; and reading one or more target items from the leaf nodes of the tree structure, the reading comprising, for each target item of the one or more target items, determining which leaf node to read from by following the mapping of the keys to node IDs through the tree structure, and searching the determined leaf node for the one or more target items based on;

a) the sort order of the items as already sorted in the first block, and b) further sorting the items of the second block by the key relative to the items of the first block.

5. The method of claim 4, wherein the tree structure comprises a B-tree.

6. The method of claim 5, wherein the B-tree is a B+ tree, further comprising:

each item of the one or more items and each item of the new items being stored only in the leaf nodes.

7. The method of claim 4, further comprising:

in at least one node of the nodes of the plurality of nodes, the first block being divided into segments and the node further comprising a shortcut block comprising a plurality of shortcuts, each shortcut comprising:

i) an indication of the key at the boundary of a corresponding segment of the first block and ii) an offset to the corresponding segment within the leaf node; and when searching the determined leaf node for the one or more target items based on the sort order of the items as already sorted in the first block, using the plurality of shortcuts to search only segments which might contain the one or more target items based on the key.

8. The method of claim 4, wherein:

writing each new item further comprising writing a back pointer associated with each item in the second block of the determined leaf node, each back pointer comprising an offset to an item in the first block of the determined leaf node with a next larger or next smaller key compared to the associated item in the second block; and reading one or more target items further comprising, when sorting the items of the second block, using the back pointer associated with each item to sort the items of the second block by key relative to the first block.

9. The method of claim 4, wherein:

writing each new item further comprising including an order hint that indicates, for each of the items in the second block of the determined leaf node, an order of the key of each item relative to current keys in the second block at a time of writing each new item to the second block; and reading one or more target items further comprising, when sorting of the items of the second block, using one or more order hints to sort the one or more target items of the second block by the key relative to the items of the first block.

10. The method of claim 9, wherein using the order hint further comprises:
processing the items in the second block in the order that the items were stored; and
using the order hints to sort the items in an array, the array storing offsets of the items within the second block; and
wherein when each item with an order hint i is processed,
an offset of the item in the second block is inserted into a position i in the array, and all the items at positions j>i are moved right,
such that after the second block is entirely processed, the array contains the offsets of the items in the sorted order.

11. The method of claim 4, wherein:
the data structure further comprises a page table mapping the node ID of each node to a memory address;
reading further comprising, when reading from the determined leaf node having a determined node ID, using the page table to determine the memory address of the determined leaf node in memory; and
writing further comprising, when updating the determined leaf node in order to write, split or merge the determined leaf node:
writing an updated version of the determined leaf node to a new memory address,
determining that writing the updated version is complete, and
updating the memory address of the determined leaf node in the page table to point to the new memory address.

12. The method of claim 4, wherein:
the second block has a maximum size; and
writing further comprises:
determining that writing the new item would cause the second block of the determined leaf node to exceed the maximum size, and
merging the second block with the first block of the determined leaf node.

13. The method of claim 4, wherein:
the data structure further comprises a page table mapping the node ID of each node to a memory address;
reading further comprises, when reading from the determined leaf node having a determined node ID, using the page table to determine the memory address of the determined leaf node in memory; and
writing further comprises, when updating the determined leaf node in order to merge the second and the first block:
writing an updated version of the node including the merge to a new memory address,
determining that the merge is complete,
after determining that the merge is complete, updating the memory address of the determined leaf node in the page table so as to point to the new memory address.

14. The method of claim 4, wherein:
each leaf node indicates the node IDs of one or more sibling leaf nodes, the sibling leaf nodes encompassing keys neighboring the keys of each leaf node;
reading one or more target items further comprising performing a range scan to read the one or more target items from a range of keys; and
performing the range scan comprising:
reading from a range of items spanning more than one leaf node,
determining one of the leaf nodes of the more than one leaf nodes encompasses one of the keys in the scanned range by following the mapping of the keys to node IDs through the tree structure, and
determining at least one other leaf node of the more than one leaf nodes encompasses at least one other key in the scanned range by using the node ID of at least one of the sibling leaf nodes as indicated in one of the leaf nodes.

15. A computer program embodied on a non-transitory computer readable medium or media, comprising code configured so as when run on one or more processors to perform operations comprising;
storing a data structure in a memory having an address space, the data structure comprising a tree structure, the tree structure comprising a plurality of nodes, each node having a node ID, with some nodes of the plurality of nodes being leaf nodes and other nodes of the plurality of nodes being internal nodes,
each internal node being a parent of one or more children in the tree structure,
each child of the one or more children being either a leaf node of the leaf nodes or an internal node of the internal nodes, and each leaf node being a child but not a parent,
each leaf node of the leaf nodes comprises one or more items, the one or more items each comprising a key and a value in a key-value pair; and
each internal node of the internal nodes maps the node ID of each of the children of the internal node to a range of keys encompassed by each child of the internal node;
each leaf node comprising a first block a second block, and a pointer to a boundary between the first block and the second block,
the first block being a large block having a larger maximum size than the second block and storing the one or more items, the one or more items sorted into a sort order in the address space based on the key of each item, and
the second block being a small block and storing a log of recent updates to the leaf node in chronological order, the recent updates being to the one or more items stored in the first block;
writing new items to the leaf nodes of the tree structure, each item of the new items comprising a new key within the range of keys and a new value, the writing comprising:
determining the leaf node of the leaf nodes to write each new item based on the mapping to the node ID of the leaf node within the range of keys,
writing each new item to the second block of the determined leaf node in chronological order, the new item being a recent update to the first block; and
reading one or more target items from the leaf nodes of the tree structure, the reading comprising, for each target item of the one or more target items,
determining which leaf node to read from by following the mapping of the keys to node IDs through the tree structure, and searching the determined leaf node for the one or more target items based on:
a) the sort order of the items as already sorted in the first block, and
b) sorting the items of the second block by the key relative to the items of the first block.

16. The computer program of claim 15, wherein the tree structure comprises a B-tree.

17. The computer program of claim 16, wherein the B-tree is a B+ tree, further comprising:
 each item of the one or more items and each item of the new items being stored only in the leaf nodes.

18. The computer program of claim 15, further comprising storing a portion of the tree structure in a cache, the cache configured to reduce a latency and increase a throughput of tree structure.

19. The computer program of claim 15, wherein:
 the data structure further comprises a page table mapping the node ID of each node to a memory address;
 reading further comprising, when reading from the determined leaf node having a determined node ID, using the page table to determine the memory address of the determined leaf node in memory;
 writing further comprising, when updating the determined leaf node in order to write, split or merge the determined leaf node:
  writing an updated version of the determined leaf node to a new memory address, and
  determining that writing the updated version is complete; and
  updating the memory address of the determined leaf node in the page table to point to the new memory address.

20. The computer program of claim 15, wherein:
 the data structure comprises a page table mapping the node ID of each node to a memory address;
 reading further comprises, when reading from the determined leaf node having a determined node ID, using the page table to determine the memory address of the determined leaf node in memory; and
 writing further comprises, when updating the determined leaf node in order to merge the second and the first block:
 writing an updated version of the node including the merge to a new memory address,
 determining that the merge is complete,
 after determining that the merge is complete, updating the memory address of the determined leaf node in the page table so as to point to the new memory address.

* * * * *